United States Patent [19]

Dyhr

[11] Patent Number: 4,709,900
[45] Date of Patent: Dec. 1, 1987

[54] CHOKE VALVE ESPECIALLY USED IN OIL AND GAS WELLS

[76] Inventor: Einar Dyhr, Skodsborgvej 160, DK-2840 Holte, Denmark

[21] Appl. No.: 841,564

[22] Filed: Mar. 20, 1986

[30] Foreign Application Priority Data

Apr. 11, 1985 [DK] Denmark .............................. 1628/85

[51] Int. Cl.[4] .......................................... F16K 31/122
[52] U.S. Cl. .......................................... 251/5; 251/4; 251/63.4
[58] Field of Search ................. 251/1.1, 4, 5, 62, 63.4; 137/68.1; 92/89; 175/48

[56] References Cited

U.S. PATENT DOCUMENTS

| | | | |
|---|---|---|---|
| 2,124,015 | 7/1938 | Stone et al. | 251/1.1 |
| 3,599,713 | 8/1971 | Jenkins | 137/68.1 |
| 3,646,607 | 2/1972 | Dower | 251/5 |
| 3,821,726 | 6/1974 | Chang et al. | 175/48 |
| 3,868,826 | 3/1975 | Landers | 251/1.1 |
| 4,085,765 | 4/1978 | Nelson | 137/68.1 |
| 4,300,748 | 11/1981 | Kreeley | 251/5 |
| 4,310,058 | 1/1982 | Bourgoyne, Jr. | 175/48 |
| 4,378,849 | 4/1983 | Wilks | 251/1.1 |
| 4,508,311 | 4/1985 | Just et al. | 251/1.2 |

Primary Examiner—A. Michael Chambers
Assistant Examiner—John C. Fox
Attorney, Agent, or Firm—Thomas R. Morrison

[57] ABSTRACT

A choke valve specially used for regulating the flow volume and with it the back pressure of liquids or gas while drilling through shallow gas bearing formations from an off-shore drilling platform. The valve comprises a flexible cylindrical valve element (8) positioned in the valve housing (1) flow passage and where the valve is so designed that the valve element's (8) flow area can be reduced by a radial reduction of the valve element. The flow area of the valve element (8) is equal to or larger than the remaining flow area of the valve. The valve has devices (10;22) for constricting the end of the valve element (8) being nearest to the outlet opening (3) of the valve. The valve element (8) is so long that it is possible to compensate for the wear to which the end is exposed by sliding the valve element against the constricting devices (10;22) or by moving the latter along the valve element as the wear proceeds. Only the valve element (8) is exposed to wear and no other parts of the valve being positioned within the wearing zone. The valve element (8) in its withdrawn position has its total diameter free allowing a full flow through the valve. Accordingly the valve do not disturb the flow under normal condition and is not exposed to any wear. At a gas kick the well can be controlled during a long period as it is possible to compensate the wear on the valve element during operation.

10 Claims, 16 Drawing Figures

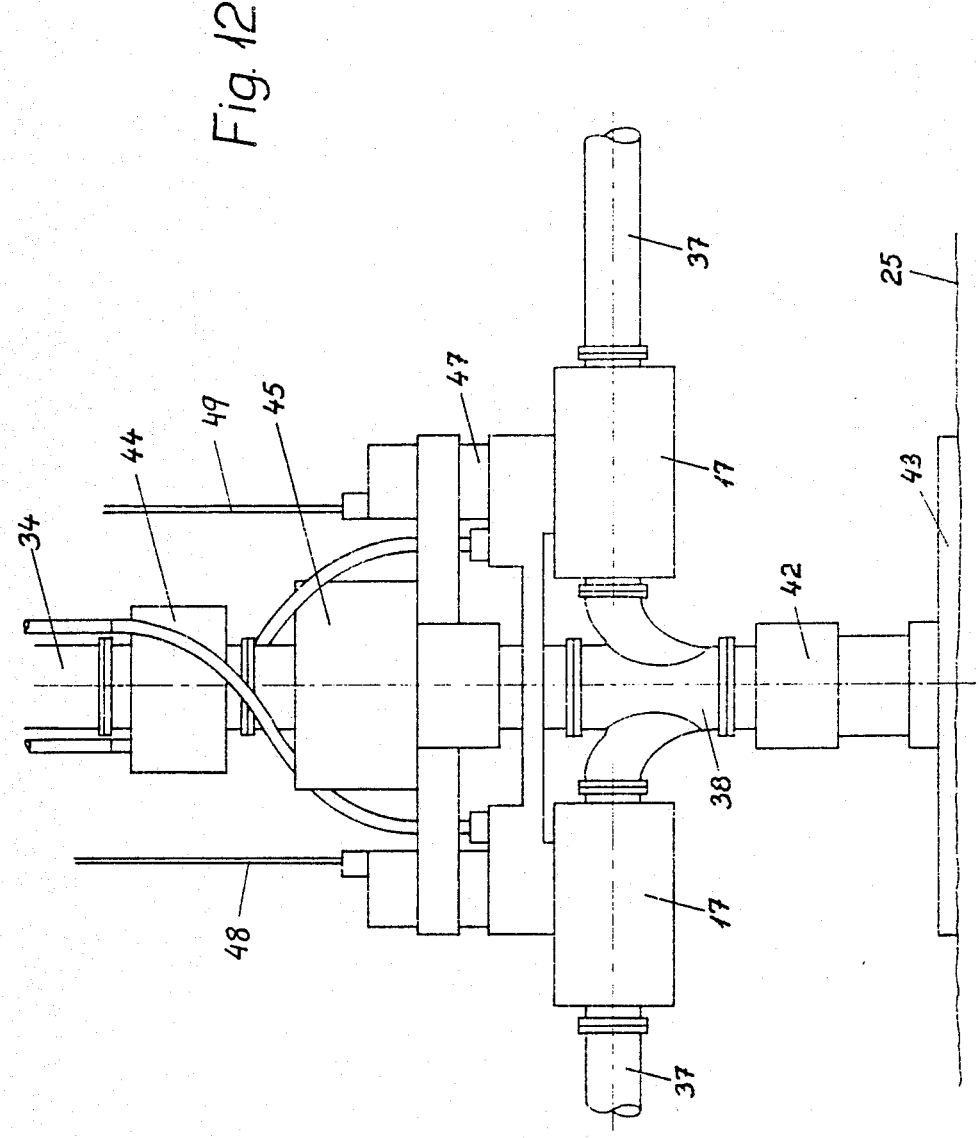

CHOKE VALVE ESPECIALLY USED IN OIL AND GAS WELLS

The invention concerns a choke valve especially used in regulating back pressure in oil and gas wells while drilling through shallow gas bearing formations from an off-shore drilling platform and constituting a flexible cylindrical valve element positioned in the valve housing flow passage and where the valve is so designed that the valve element flow through area can be reduced by a radial reduction of the valve element. In addition the invention concerns a procedure to control a so called shallow gas kick.

Drilling off-shore is done from platforms. As platforms can be used the so called jack-up rig which is a platform supported by legs standing on the sea bed, or the so called semi-submersibles which is a floating platform or a drill ship which is a conventional ship rigged with drilling equipment.

Briefly described an off-shore well is made by drilling a section of the hole, then lining the section with casing, then drilling a smaller hole which then is lined with casing etc. The casing is cemented in the formation. During the drilling, mud is circulated through the drill pipe up through the angles with the purpose of removing the cuttings as well as imposing a hydrostatic pressure equal to that which exists in the geological formation outside.

This is all a well known procedure and if a so called gas or oil influx is taken from hydro cup and deposits due to an unbalance in the hydrostatic head then the rig personal have certain well established procedures and equipment to counter the problem.

If on the other hand the gas kick is taken in the upper geological formation then the situation can become very serious.

During the 25 years or so where the industry have been drilling off-shore there have been no real satisfactory solution to control shallow gas kicks.

The risk of drilling through shallow gas sands has been reduced by the use of high resolution seismics. Where the presence of so called bright-spots indicate the presence of shallow gas. This knowledge, however, does not always keep the oil company from drilling a particular location. The reason for this can be, that the signals are too weak to be absolutely sure of shallow gas, or because the target zones are so important that the goal overshadows the risk of encountering shallow gas.

The reason can be that the use of high resolution seismic is prohibitively expensive or because neighbouring wells have shown only normal pressure formations.

The casing depth can be changed to suit the actual formation, but very little can be done to improve the strength of the 20" casing strength against vertical fracture from the abnormal pressure zones or a too high hydrostatic pressure imposed from the surface.

It is well known that shallow gas is most dangerous in the upper section of the hole which constitutes 20" casing before the 13⅜" casings.

The reason for this is that the conductor pipe and the 20" casing shoe (geological formation around the end of the casing) is unable to contain a pressure gradient which exceeds 0.55–0.60 psi per foot. Pressure which exceeds this will most likely cause the formation to fracture around the cement and will result in subsequent escape of the gas along the outside of the casing to the surface.

If this happens the rig is in danger.

In the case of a jack-up which is supported by the sea bed the outflowing gas can erode the sea bed enough to cause the rig to turn over.

For floating platforms there is danger of capsizing when the gas aerates the water around the rig.

There have been many such accidents in the drilling industry and it is an established procedure not to close the BOP valves during this phase of the drilling. The standard rule for off-shore drilling is to close the divertor valve and divert the gas over board. But even with this procedure the shallow gas kick still causes disasters.

One of the most common reasons for shallow gas blow-out is drilling with too small a trip margin. It takes only very little swabing effect to cause the gas to enter the well bore. On the other hand drilling with too large a margin will easily cause a surge pressure to lose drilling mud to the formation with subsequent loss of hydrostatic pressure.

The shallow gas will then move to the surface in a few seconds taking the drilling crew by surprise. When the first gas bubble has surfaced part of the mud column is displaced with the resulting loss of hydrostatic pressure. Unless a balancing hydrostatic pressure is established by replacing the lost mud or by increasing the mud weight or by applying backpressure on the well head the well will flow out of control.

After having taken a kick it is a normal procedure to close the divertor and start both mud pumps pumping into the hole. By increasing the hydrostatic head the gas flow into the well bore will hopefully stop.

But what happens if the well in unloading mud faster than it can be pumped into it? Dependent on the rate of unloading it can be impossible to re-establish a balancing hydrostatic pressure.

Having the divertor closed on the well flowing out over the side one can only hope that the formation will breach itself or deplete before any damage is done to the divertor lines. But there is no guarantee that the flowing sand and gas will not come through the divertor lines or that the gas does not contain $H_2S$ which is a very poisonous gas. On top of that it is very likely that the well gas will ignite. To prevent this the engines must be shut down further complicating the control process.

In the process of controlling the well the gas will most likely increase in velocity carrying more sand along from the formation. This flow is extremely abrasive and can cut the divertor lines in minutes. If this happens then the rig is in extreme danger and the personnel must be evacuated. At this point the BOPs if they are installed would have to be closed stopping the gas flow and buying time for mixing of heavy mud and repairing the divertor lines.

Since there is no way to know whether the formation around the casing will withstand the pressure there is no alternative but to try.

If the gas does not come up around the casing then the well can be killed by using a conventional kill procedure. But if conversely the gas does come around the casing then the BOPs must be opened again and the process of diversion must be continued. In the latter case one can only hope that the gas will stop flowing around the casing. If this does not happen the rig must be prepared for abandonment. In the case of a floating rig the procedure will be to cut the pipe and move the rig away by pulling on the anchor lines. In this case the equipment damaged would be limited to the subside BOP and the well head. In case of a jack-up there is only a very slight chance to move the rig. In most cases the rig will have to be abandoned.

As previously described the uncoming gas rises to the surface very quickly displaces the drilling mud in the annulus. Since closing the BOP is not recommended then there is only the alternative left to pump drilling mud into the well with maximum pumping capacity. While pumping, the gas will continue to enter the well bore until unbalancing hydrostatic head is established.

As is often the case the incoming gas displaces a larger volume of drilling mud than can be replaced by the mud pumps. As an example will a two barrel gas influx at 1500' and 9 ppg mud expand to 100 barrel at the surface.

If such a kick is allowed to expand to the surface then it in theory will vacate 275' of the 20" annulus causing a 128 psi pressure drop in the hydrostatic head. Because of this reduction more gas will enter the well bore and if the incomming mud from the mud pumps continue to be less than the displaced mud then the hydrostatic pressure will be reduced to a point where the incoming mud will be ejected with the gas no matter how heavy it it. To kill the well at this point is then impossible.

The logical way to limit the gas expansion as it rises to the surface is to increase the surface pressure. In a normal kill procedure this is done by opening the high pressure choke valve enclosing the BOPs. Then adjusting the choke valves to establish the desired back pressure. As it already has been established that in the top section of the hole it is dangerous to close the BOPs and as all wells are drilled without BOPs on the 36" casing and some wells drilled without BOPs on the 20" casing and as high pressure choke valves do not have a large enough choking diameter for venting shallow gas then it is not possible to increase surface pressure using the conventional equipment.

If one could apply a back pressure on the surface then the gas expansion would be limited causing a smaller hydrostatic pressure drop in the bottom of the hole.

This could make it possible for the mud pumps to keep up with the mud displacement and by pumping heavy mud into the well bore could make it possible to regain the balancing head. While it is important to refill the well with drilling mud it is equally important not to break down the formation at the casing shoe.

It is a purpose of the invention to design a choke valve that can regulate the back pressure at the well head while flowing shallow gas even when the choking process requires hours of flowing highly abrasive gas/sand/mud mixture without wearing the valve below its operating specifications. This is extremely important as it is impossible to perform any repair work during the choking process.

According to the invention this problem is solved by a valve indicated in the introduction, viz. by designing it so that the flow passage of the valve element is equal to or larger than the remaining flow passage of the valve, that the valve has devices for constricting the end of the valve element nearest to the outlet orifice of the valve, that the inner parts of the valve except for the valve element are not essentially exposed to abrasion, and that the valve element is so long that there will be compensated for the abrasion, to which the end is exposed, by pushing the valve element against the constricting devices or by moving the latter as the abrasion proceeds. By bending the outermost end of the flexible cylindrical valve element into the passage of the valve as abrasion proceeds, the length of the valve element will determine the life of the valve. As the valve element can be made substantially longer than its wall thickness, the valve can be given a substantially longer life than the well-known devices. Besides, except from the valve element, the interior parts of the valve are not essentially exposed to wear.

As regards the bending of the flexible tubular valve element's end into the flow passage, then this can be carried out in different ways. For instance, the valve element can be exposed to radial forces. By way of example a series of pistons may be placed longitudinally within the valve housing and so arranged that they can be pressed against the valve element as its end is abraded. Another possibility is to constrict the end of the valve element by means of a steel wire or a chain wrapped around it or by using clamping jaws. An embodiment is described in which between a cylindrical wall and the valve element is placed one or more flexible bodies, divided into one or more chambers which can be filled with liquid or gas and arranged so that the pressure in the individual chamers can be regulated individually to exert a radical pressure on the valve element in order to keep the orifice of the latter constricted as abrasion proceeds. Thus the end of the valve element is kept constricted by directing the pressure along the element as its end is worn.

By another embodiment, the flexible cylindrical valve element has two terminal surfaces facing the valve's inlet and outlet orifice respectively, and it has an essentially radial supporting surface at one end of the element and has a valve seat intended for co-operating with the other end of the element, and where the supporting surface and the valve seat are designed so that they can be moved axially against each other thus bending the end of the valve element causing a radial constriction of the passage of the valve; it also has devices for adjustable displacement of the supporting surface and the valve seat towards one another. The desired end diameter of the valve element can be kept constant, even if the flowing liquid or gas abrades the valve element heavily. This is obtained by displacing the valve element and the valve seat axially in proportion to each other until the back pressure wanted is achieved. As the bent part of the valve element is worn down, the valve element and valve seat are moved further towards each other to keep a constant back pressure resulting in more of the valve element being bent inwards thus keeping a constant inner diameter or passage. This process can go on until all of the bendable part of the valve element is worn out. The length of the bendable part of the valve element is merely a function of the safety margin desired.

By a suitable embodiment of the valve its seat is designed conically with its sloping surface facing the valve element and the passage of the valve. Thus the end of the valve element will be bent against the conical valve seat and into the passage.

The valve seat may be shaped in many different ways, e.g. it may consist of a series of segments, however, it is suitable to give it an annular form.

In principle it is secondary if the valve seat is moved against the valve element or reversely, however, it is most suitable to move the valve seat against the valve element. For a certain embodiment of the valve the supporting surface of the valve element is firmly connected with the valve housing, while the valve seat is axially movable.

The mutual axial displacement of the valve element and the valve seat may be designed in many different ways; by way of example it can be carried out by means of bolts which are tightened or using cables or chains. However, a suitable embodiment of the valve is characterized by the device for the mutual, axial displacement of the supporting surface and the valve seat being a hydraulic driving unit.

An embodiment of the valve includes a hydraulic driving unit comprising at least two hydraulic cylinders placed on either side of the valve housing, with one end attached to the housing and the other one to the valve seat. Placing the hydraulic cylinders symmetrically in proportion to the housing will neutralize an offset pull. In addition the movement of the hydraulic cylinders is easily controlled.

It is principally secondary if the cylinder jacket is attached to the valve seat and the cylinder piston to the valve housing, however, it is most suitable to attach the jacket to the valve housing and the cylinder piston to the valve seat.

In a further embodiment of the choke valve, the valve housing comprises an interior cylindrical wall, forming the passage, and an outer cylindrical jacket concentric with said wall, and the hydraulic driving unit is positioned in the space between the two walls. Thus the choke valve can be placed as a unit within the well bore, and in addition the hydraulic driving unit lies protected.

To prevent dirt being accumulated in the valve during its production, shipment and storage its inlet and outlet orifices be covered by a protective membrane which is torn at a certain pressure.

To preserve the elastic properties of the valve element the passage between the two protective membranes may be filled with a preservative. Thus the choke valve will always be ready to work, regardless of the fact that it has not been working for a rather long period.

Another embodiment of the protective membrane allowing an undisturbed flow through the valve when it is not in use, is characteristic by the fact that it is designed as a tubular, preferably flexible envelope positioned within the valve element and stretching along the entire length of the valve and having flanges at its ends intended for clamping it to the entire valve, viz. at its inlet and outlet respectively. Beyond its not being disturbing the flow when it is in its passive position, it can also be tested and even all the way down to the closed position by making the protective envelope flexible enough. As distinct from the above embodiment, this protective membrane must not be burst to open, but be worn open at the moment when you start throttling the valve.

The wear-compensating, variable constriction of the throttle valve, of which the full flow diameter is up to 20", is operated hydraulically. The choke valve is capable of controlling a flow of heavily abrasive liquids or gas—from when the flow is free and until it is totally stopped.

In case of a blow out in the top hole section of the well bore the divertor and the mud return lines are closed. The gas can now only flow through the choke. The choke control console is installed on the drill floor and is either connected to the BOP accumulator unit or to a separate hydraulic pumping unit. The console contains pressure gadets for measuring the pressure in the annulus and discharge lines as well as special combination control gadget included in this invention and capable of displaying not only the floater armature but also the degree of wear on the flexible insert.

The console can also be preprogrammed to open the choke in case the back pressure exceeds a pre-calculated maximum fracture pressure.

When the heavy kill mud has entered up into the annulus thus increasing the hydrostatic pressure the surface backpressure can be reduced to avoid loss of circulation. In the case where the well continues to flow the choke pressure will be kept at the maximum allowable to avoid complete depletion of the well and to allow heavy mud to be mixed and pumped into the well bore.

If the kick has been detected too late then the rig personnel must continue pumping into the well with maximum pump capacity while still applying maximum allowable back pressure to the choke. At the same time the rig crew will mix kill mud to a pre-calculated density.

The flow from gas bearing sand can be extremely abrasive and since such parameters as bottom hole pressure, fracture gradient, gas volume, sand and water contents etc. are unknown quantities it is impossible to predetermine how long the well will keep blowing. It be therefore important that the surface equipment is designed to continue the choking process for long periods under the most abrasive conditions.

The valve element can be made out of rubber compound which on one hand has the ability to withstand the abrasive flow and on the other hand has the flexibility it takes to close the valve. As the gas and sand flow under a prolonged choking process whereof the flexible material which is exposed in the choking orifice the back pressure will decrease. This will cause the operator to push the valve seat further against the valve element thus bringing more flexible material into the choking orifice, with subsequent decrease of the orifice. This will increase the back pressure. Unveven wear on the inside of the flexible element such as channeling has little or no effect on the efficiency of the choke. The valve seat and other vital metal parts are protected against wear by the valve element.

The elastic valve element has cast grooves stretching concentrically and longitudinally on its outside thus dividing it into segments which during a prolonged wear help to keep the choke opening clear. The worn segments will be carried away by the flowing medium.

The valve element can be eroded continuously over the total stroke of the hydraulic cylinders and protects against prolonged flows from the well.

The choke valve does not eliminate all the risk involved with drilling throug shallow gas zones. But it is an important alternative to the procedures available to-day and furthermore the investment only represents a fraction of the potential loss associated with the full scale blow-out.

If attempts to stop the flow with the last kill-mud has failed then the process enters in its second phase. At that time it is necessary for the personnel to have sufficient time to mix a new batch of kill-mud, prepare to set a cement plug or to wait for a new delivery of barite or cement. While this is going on sea water is pumped into the well bore at full capacity. At this point in time the well is most likely blowing gas mixed with sand and water and it is safe to assume that the 20"/5" annulus is aerated to such a degree that the hydrostatic pressure on the 20" casing shoe is only a fraction of the original pressure.

Based on this assumption the backpressure is increased to substitute. In theory if the well is flowing 100% gas then the backpressure could be increased to reflect the maximum allowable pressure on the 20" casing shoe. Since there is no exact way to determine the actual hydrostatic pressure on the casing shoe it is necessary to make an estimate based on the visual judgement of the gas/water/sand mix which flows from the well.

Flowing gas mixed with sand will wear down any existing divertor lines in a few minutes. By using this choke valve combined with Densit lined housing spittings and piping the choking process can go on for a long time.

The choke valve can be installed in combination with the existing divertor. This system, however, does normally not allow a smooth flow from the well head to the oil bore line. This can cause successive wear in places as well as blocked up lines with subsequent uncontrolled increase in backpressure. Another installation mode is to install the choke on a special mud flow cross under the existing divertor system. This system will then only be installed when drilling the particular section of the hole. As a new feature the flow can be diverted on the sea floor. This is done by installing the mud cross and choke on the subsea well head. The well head is then controlled through the rise of kill line. The rised choke line can be used to monitor the annulus pressure and the control parts on the upper marine riser package can be used to operate the valve. As an additional feature the inside of all pipings and fittings can be coated with Densit (trade mark).

The embodiments of the invention are diagrammatically illustrated in the accompanying drawings, in which.

Figure 1:
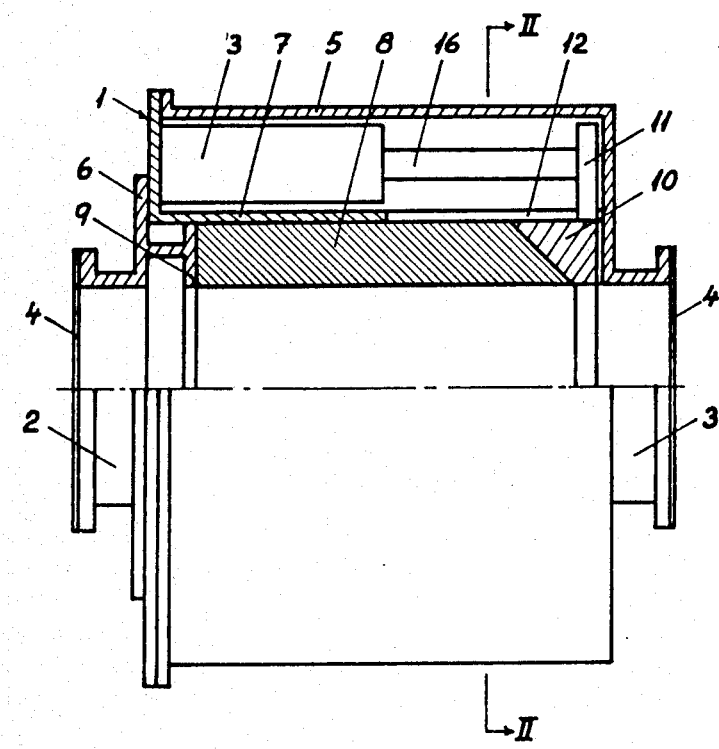
FIG. 1 is an axial cut-away of the choke valve according to the invention.
Figure 3:
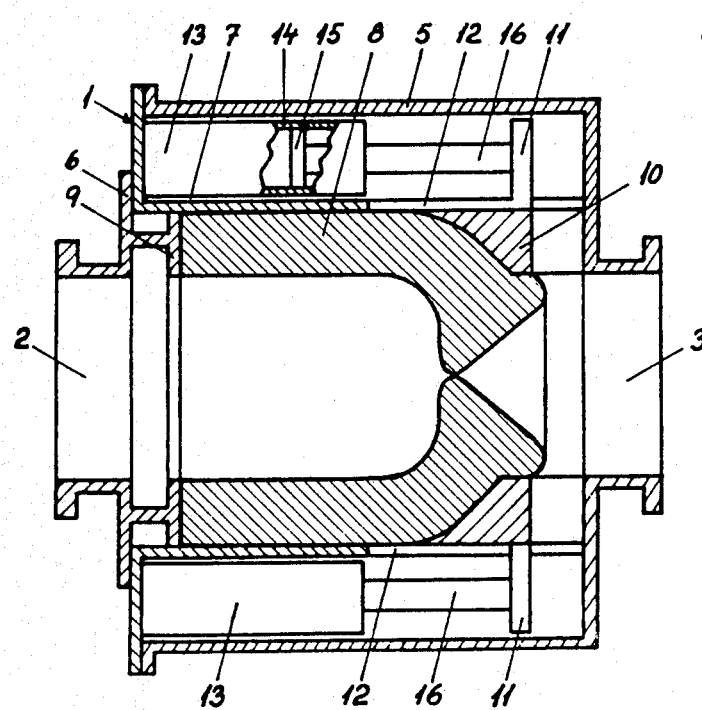
Figure 2:
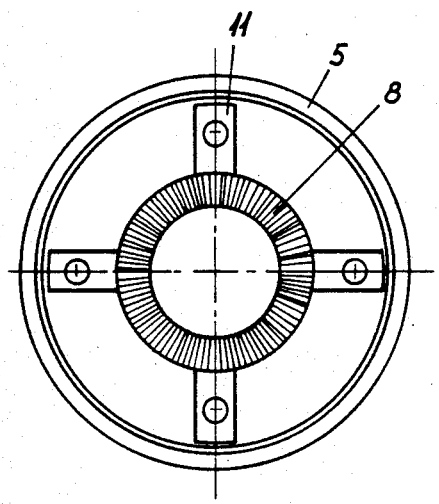
FIG. 2 is a cross section of the choke valve according to FIG. 1.
Figure 4:
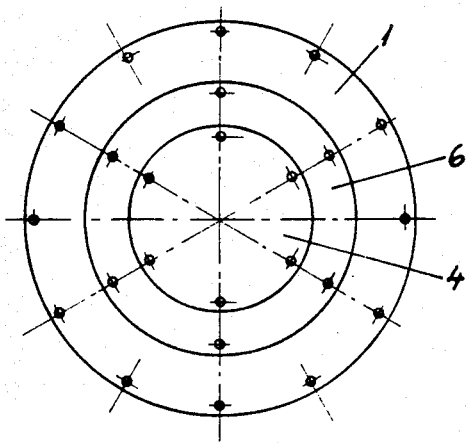
Figure 5:
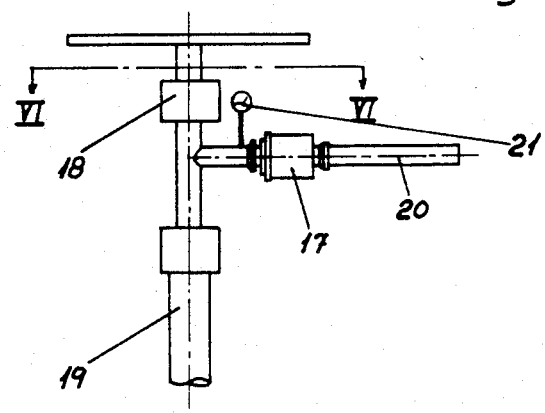
Figure 6:
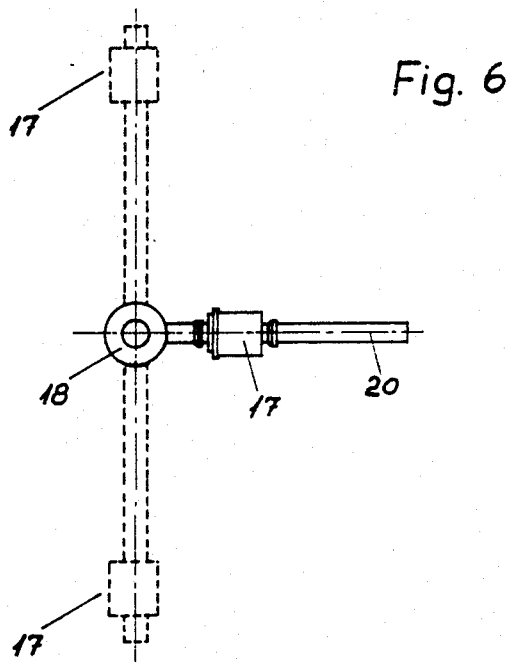
Figure 7:
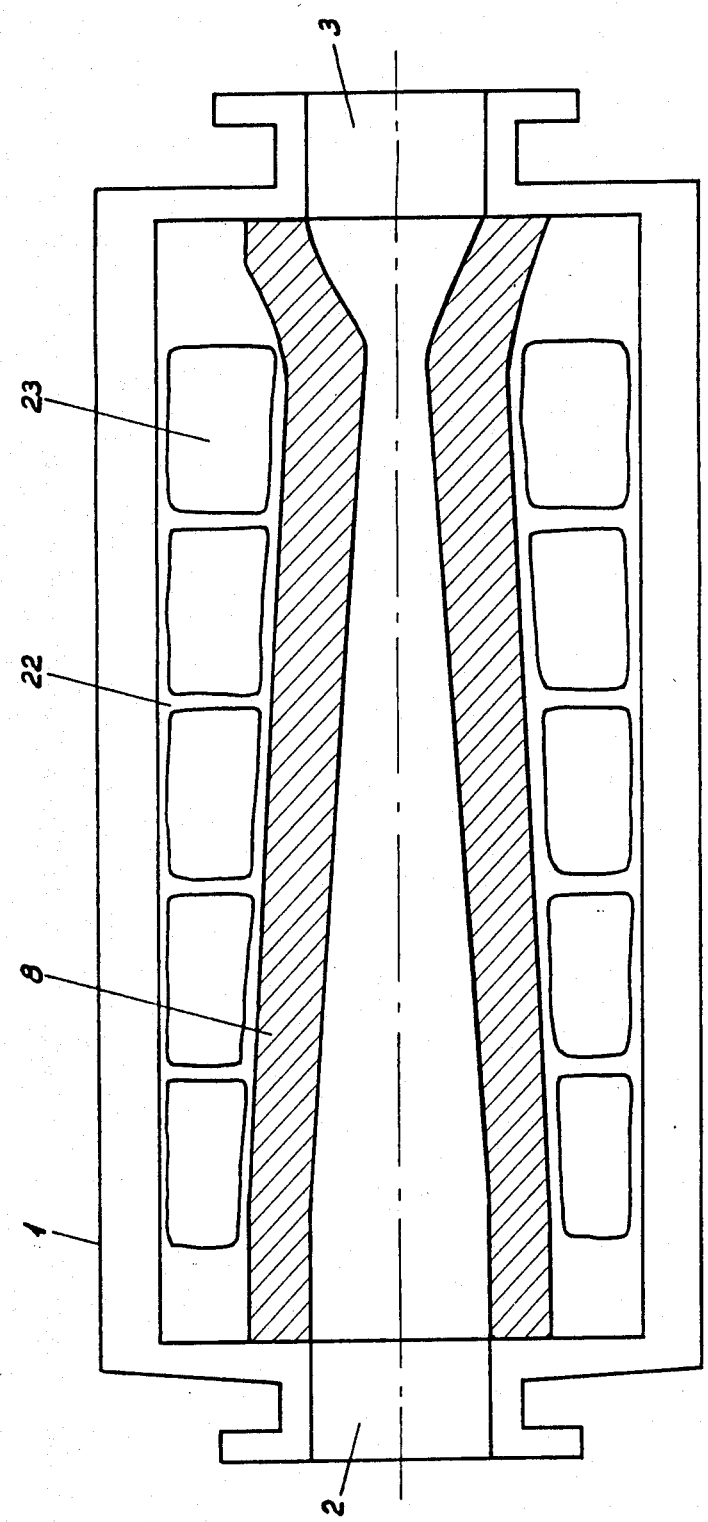
Figure 8:
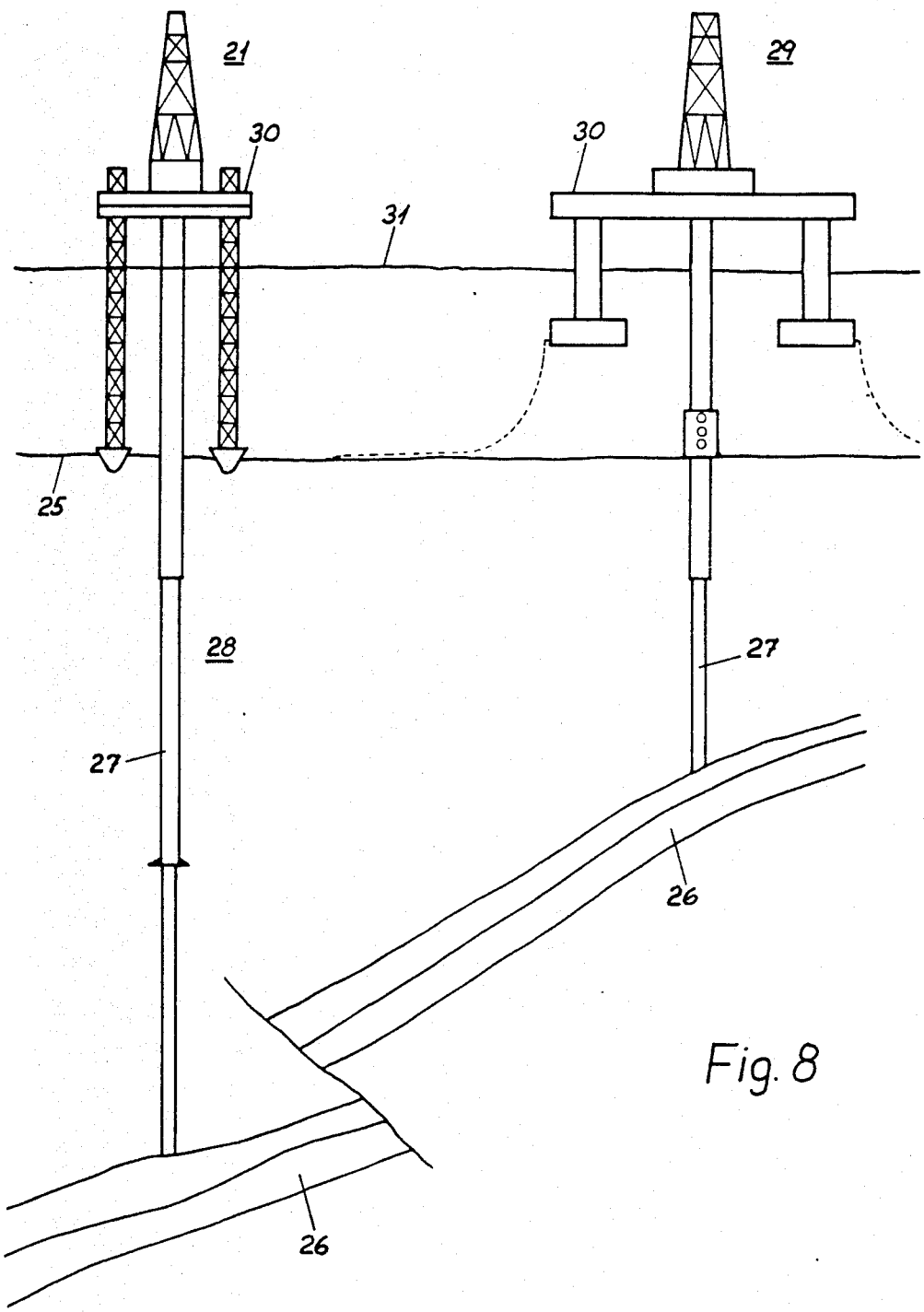
Figure 9:
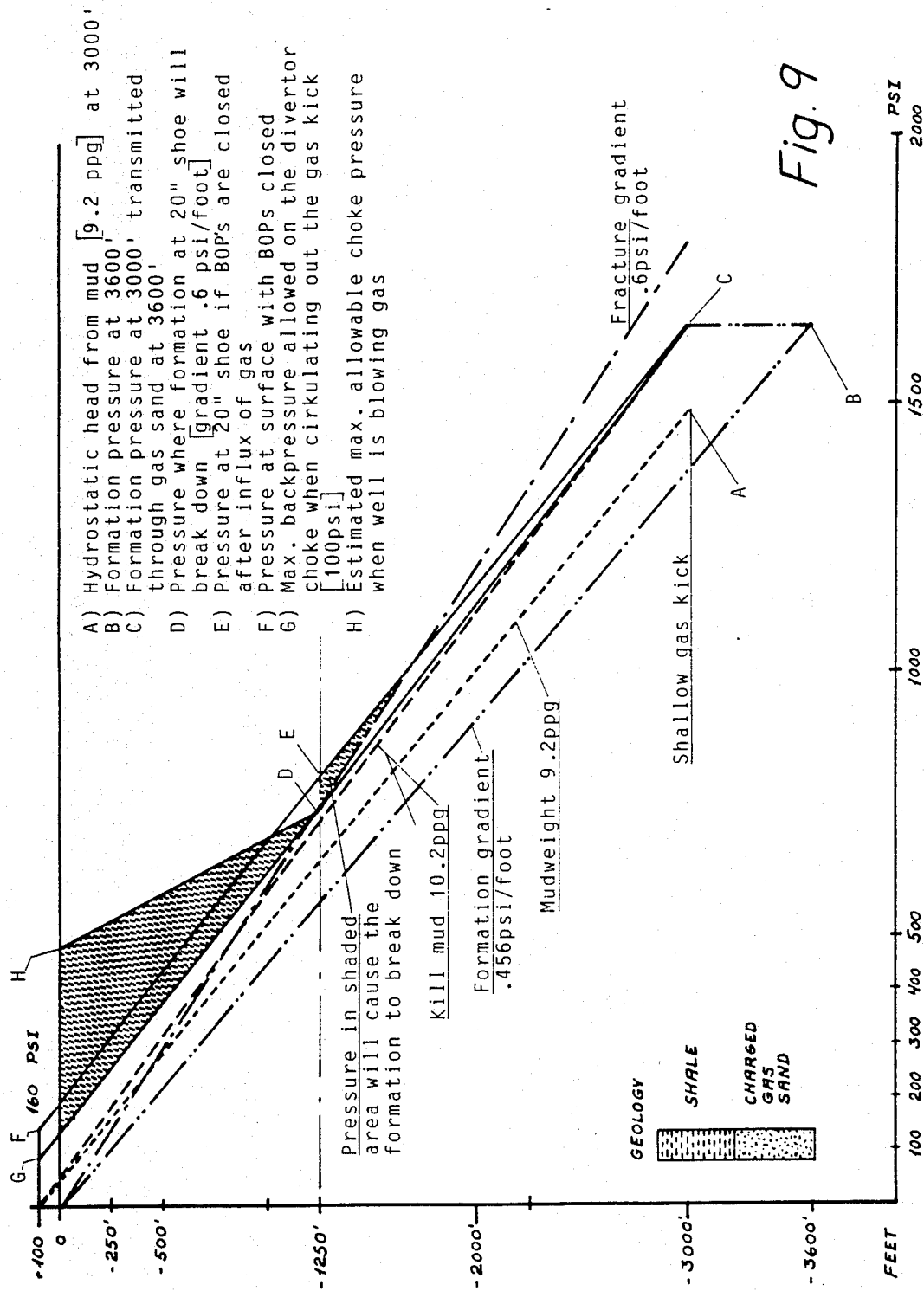
Figure 10:
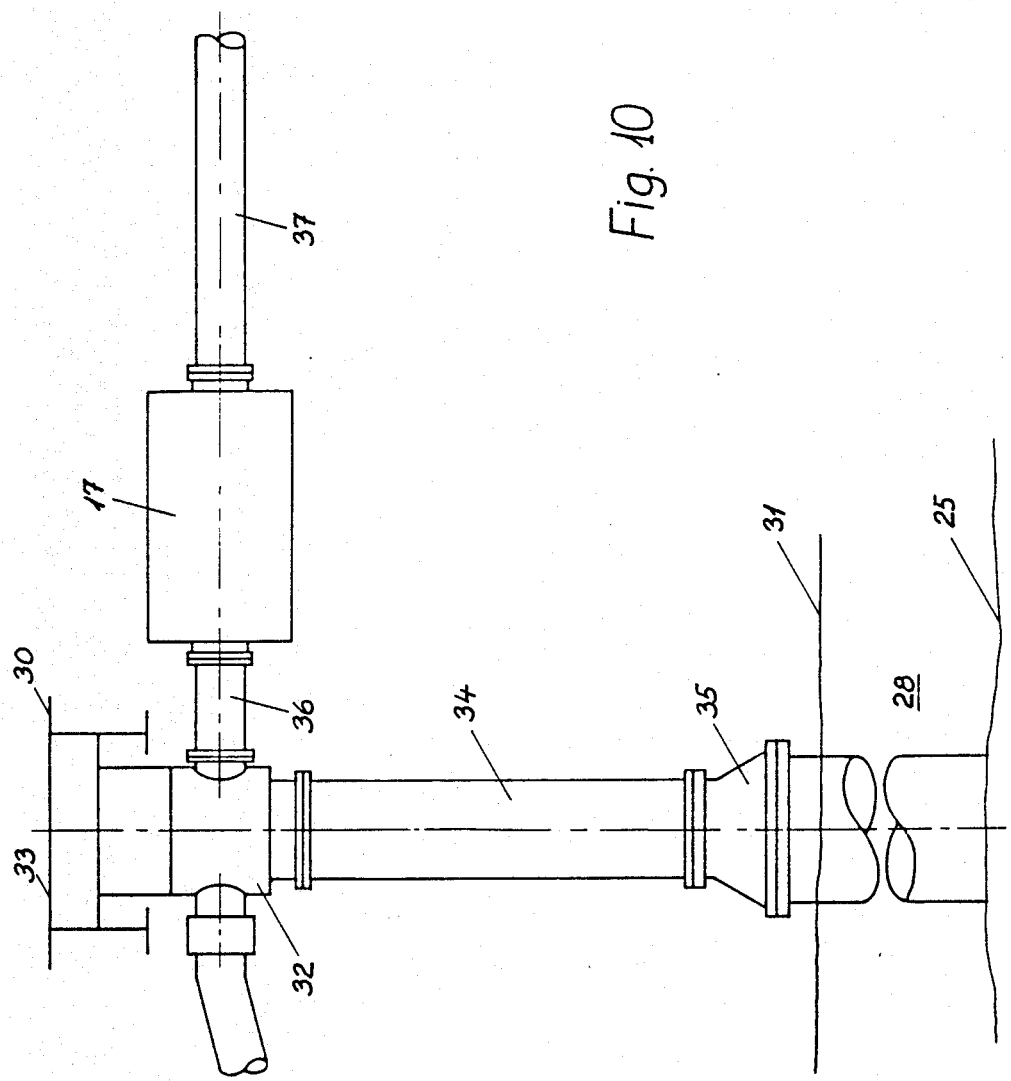
Figure 11:
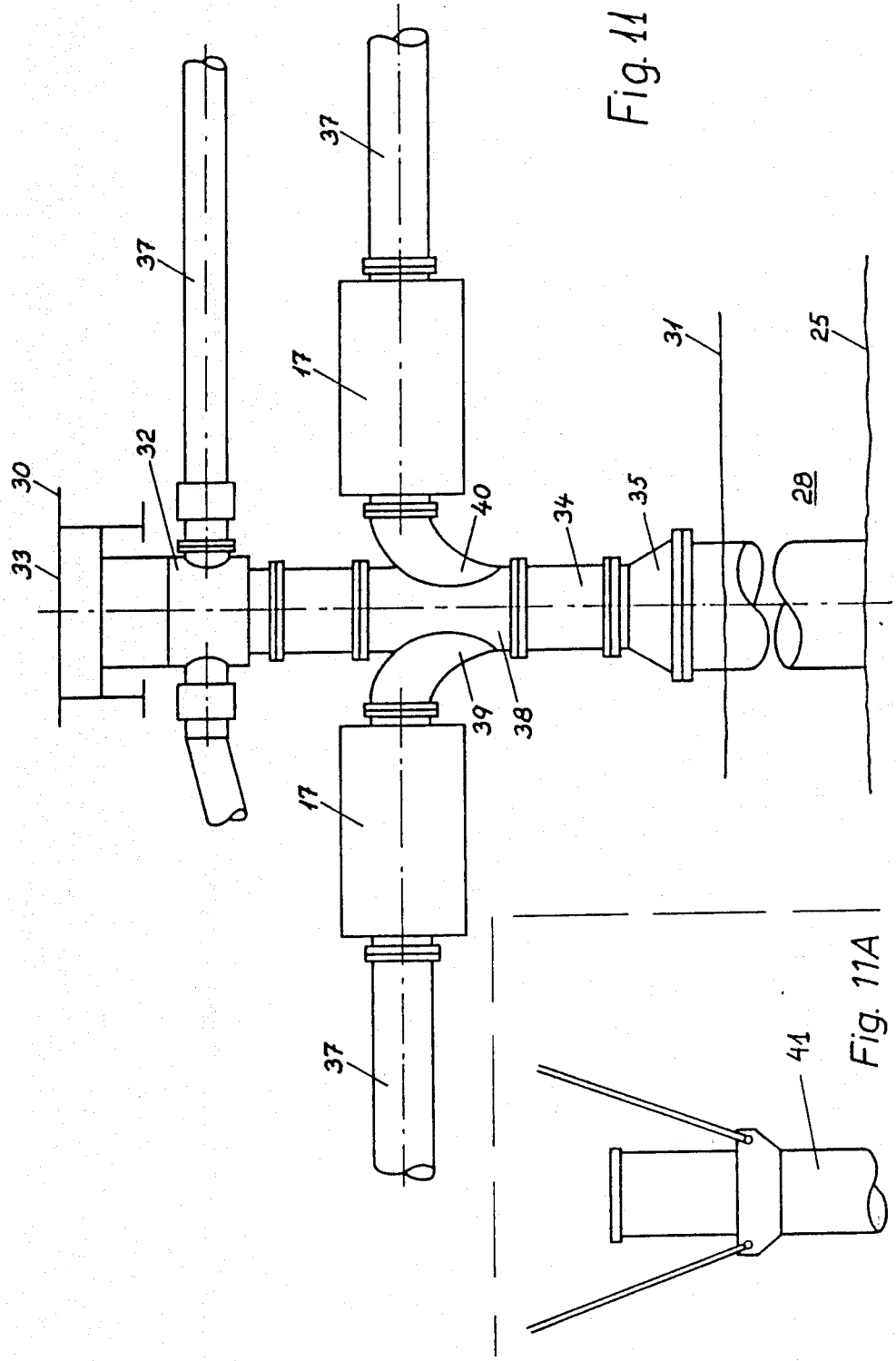

FIG. 3 is a longitudinal section as in FIG. 1, but here the valve is shown working, FIG. 4 shows the choke valve of FIG. 1 locked at directly from its end, FIG. 5 shows a typical surface arrangement of an off-shore oil or gas well while drilling in the upper strata, FIG. 6 is a horizontal section of the arrangement shown in FIG. 5, FIG. 7 shows another embodiment of the choke valve according to the invention, FIGS. 8A and 8B show schematically a jack-up drilling rig and a semi-submercible platform, respectively where both platforms have drilled into a shallow gas bearing formation which communicates to deeper gas sand through a fault, FIG. 9 shows pressure/depth diagram showing the pressure steps used in a typical kill procedure with emphasis on use of this divertor choke, FIG. 10 shows the choke valve mounted on an existing divertor system, FIG. 11 shows the choke valve mounted on a double outlet mud cross under the existing divertor system, FIG. 12 shows the choke valve and mud cross mounted on a subsea well head with the lower marine riser packet mounted on top. This is used on drill ships and semi-submercibles.

Figure 13:
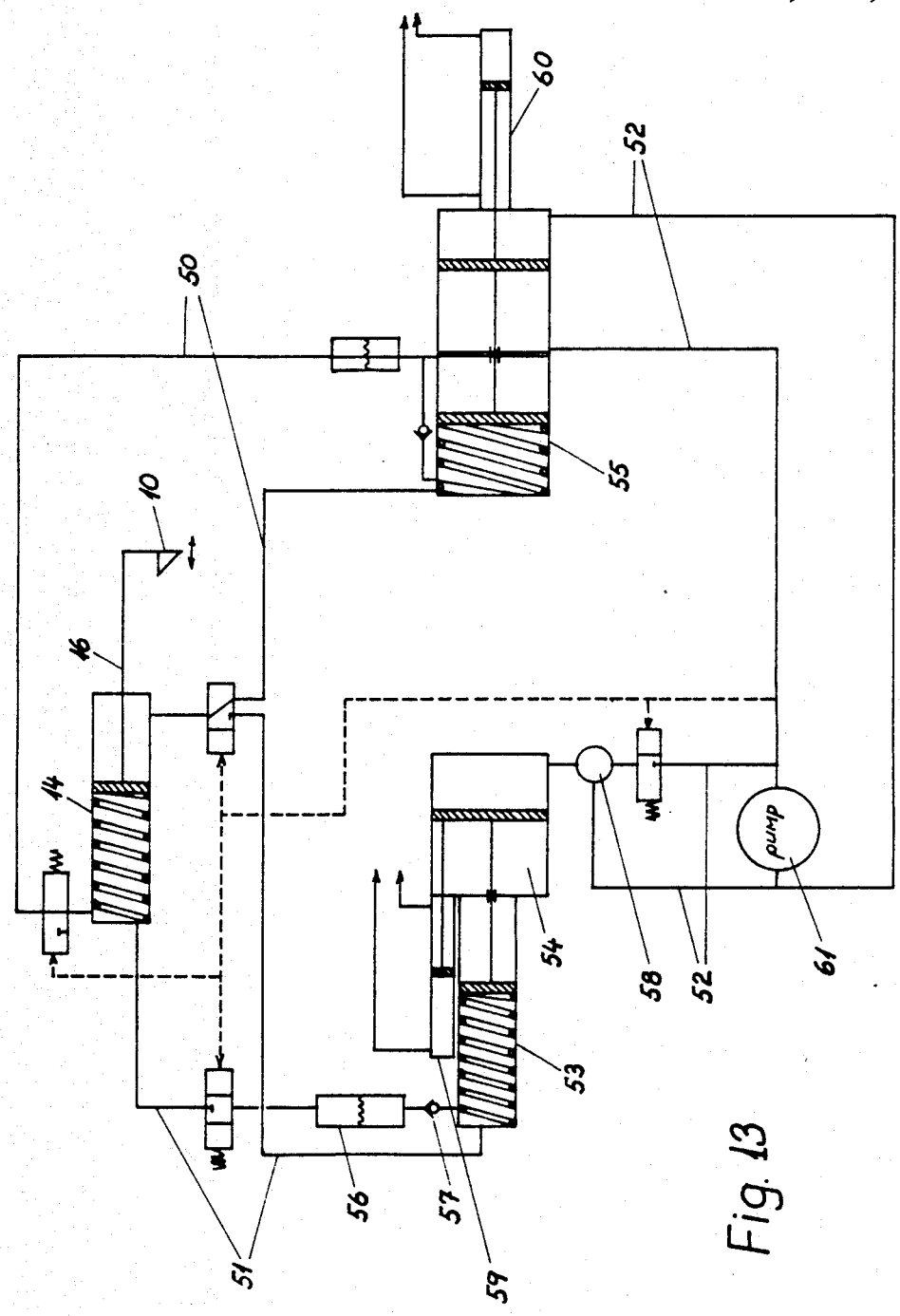
Figure 14:
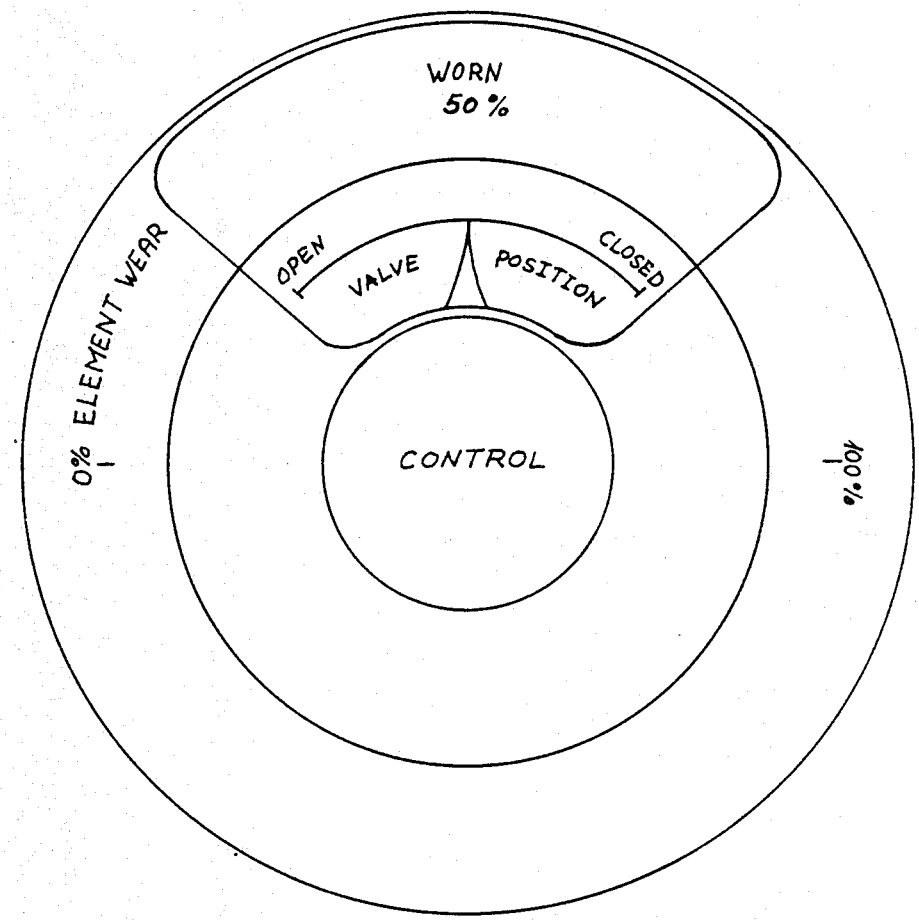
Figure 15:
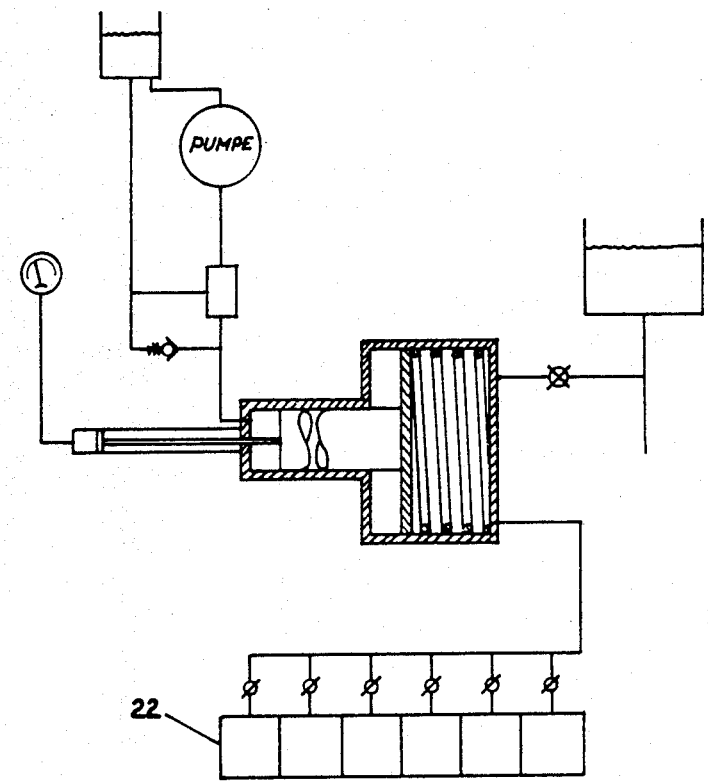

FIG. 13 shows a hydraulic steering system for steering the movement of the valve seat, FIG. 14 shows a control and scale unit to the hydraulic steering system, and FIG. 15 shows a hydraulic system for the valve illustrated in FIG. 7.

The choke valve illustrated in FIG. 1-4 of the drawing comprises a cylindrical jacket 1 with an inlet and an outlet joint 2, 3 fitted with flanges which, as it appears from FIG. 1, can be covered by protected membranes 4 as long as the valve has not been in operation. In the embodiment shown the valve housing comprises three parts, viz. an exterior jacket 5 firmly combined with the outlet joint 3, an interior part 6 firmly combined with the inlet joint 2 and an intermediate part which forms a cylindrical wall 7 defining the flow passage between the two joining ends 2, 3 and which is build integral with 1.

Internally and along an essential part of its length the wall 7 houses a flexible tubular valve element 8 with a flat first end resting against a support 9, which is firmly combined with the interior part 6 of the valve housing, and another conical end which co-operates with a valve seat 10 or with a contracting piston. The interior and the exterior surfaces of these are flush with the exterior and interior side of the tubular valve element 8 when the valve is fully open is as it appears from FIG. 1.

The valve seat 10 is equipped with radially protruding flaps 11, e.g. four such wings passing through axial slits 12 in the wall 7, and with a corresponding number of hydraulic driving units 13 are positioned in the annular space between the walls 5 and 7. The cylinder 14 of the driving unit is supported by the intermediate part of the valve housing and its piston is connected to the corresponding flap 11 by the piston rod 16.

In the position shown in FIG. 1 the pressure medium via hoses not shown can be carried to the piston on the side with the piston rod and by this cause the valve seat 10 to move to the left on the drawing. As the tubular valve element is firmly supported by the support 9, the displacement of the valve seat will squeeze the right end of the tubular element 8 to take up the position shown in FIG. 3, where the flow passage through the valve is totally closed. However, the valve seat 10 is adjustable to any position between those shown on the drawing, so that the passage remains more or less open and thus controls the liquid flow as wanted.

The constricted zone formed by the inwards bent end of the valve element 8 is exposed to a considerable abrasion, but this wear will be compensated for by gradually displacing the valve seat 10 axially against the valve element 8. Therefore, such an adjustment for wear can be carried out until the valve seat 10 has reached its outermost position, i.e. only limited by the length of each of the hydraulic cylinders' stroke.

The flexibility of the tubular valve element 8 can be improved by axial grooves distributed over its inner surface and its outside can have circumferential weakening grooves, which indicate "clear" constriction zones as the abrasion proceeds and results in a successive sacrifice of the material of the valve element.

FIG. 5 shows a typical surface arrangement of an offshore oil or gas well drilling mounted with the choke valve 17 described above. In case it is necessary to air the well because of an inflow of gas from the strata drilled a divertor 18 is closed. By this the pressure in the well 19 increases until the protective membrane 4 of the choke valve is torn and the drilling liquid flows through the choke valve and the divertor 20. After that the drilling operator can adjust the end diameter of the valve element 8 by exerting pressure on the valve seat 10 by means of the hydraulic driving unit 13 and with it regulate the back pressure in the well to a beforehand calculated maximum pressure which is read from the manometer 21. The dotted line in FIG. 6 indicates an alternative mounting of two choke valves, one on either side of the well.

In FIG. 7 of the drawing there is shown another embodiment of the choke valve according to the invention. The reference numbers employed for certain parts correspond to the same parts in FIG. 1. Between the valve housing 1 and the valve element 8 there is positioned a flexible element 22 stretching over the total or nearly the total length of the valve element. That flexible element is divided into a series of separate chambers 23 into which a liquid or gas can be led under pressure. By adjusting the pressures in the individual chambers 23 you can obtain that the valve element 8 takes up the shape shown in the figure, consequently a gradual constriction towards the outlet end of the valve. As this end of the valve element is worn-down, the pressure in the outermost chamber at this end is reduced, whereas the pressure is increased in the next chamber to constrict the worn-down end of the valve element and so on.

FIG. 8A shows quite schematically a drilling platform 24 of the socalled jack-up type, i.e. a drilling platform supported by legs standing on the sea bed 25. It is illustrated that while drilling a shallow gas zone 26 is hit. In this case it will not involve any especially critical situation, as you will not hit the shallow gas zone until after establishing the 20" casing 27. In this case the casing 28 will be able to resist the forces occurring when the well bore is closed with the usual BOPs.

FIG. 8B shows a far more critical situation, viz. where, from a semi-submersible drilling platform 29, while establishing the 20" casing 27, the shallow gas zone 26 is penetrated. Here, due to geological displacements, the strata, is placed higher. With the known technique you are powerless here and can only hope for good luck. As mentioned earlier, a closing of the well bore will entail a great risk of breaking the casing 28 and the surrounding geological formation, so that gas under high pressure will leak up through the formation. Irrespective of it being about a jack-up 24 or a semi-submersible rig 29 it is equally hazardous. As to the jack-up 24 the ground under the legs will be eroded so much that the platform may turn over. As regards the semi-submersible platform 29 the water will be aerated so that the platform looses its buoyancy.

Utilizing the present invention you can throttle the drilling under conditions so well controlled that there is a possibility of reestablishing the back pressure thus regaining control of the drilling.

FIG. 9 of the drawing illustrates the pressure conditions of a drilling which penetrates a gas-bearing sand stratum—a so-called shallow gas zone 26. The horizontal axis indicates the pressure in psi and the vertical axis the level in feet. The drill floor 30 (FIGS. 8A, 8B) is found on level +100' above the water surface 31 on level 0 as starting point. The sea bed 25 is found on level −250'. On level −3000' the drilling penetrates a shallow gas zone 26.

The extreme point of the curve A indicates the hydrostatic head of the well bore immediately before the kick with a drill sludge the volume weight of which is 9.2 ppg. The point B gives the formation pressure on level −3600' which is the under side of the shallow gas zone 26. Going out from geological measurings carried out earlier, the formation gradient is indicated as 456 psi/foot. The point C indicates the formation pressure at the upper side of the shallow gas zone on level −3000'. The pressure is like that on level −3600', the gas pressure being constant everywhere within the shallow gas zone 26.

The point D indicates the pressure at the 20" casing shoe, where the geological formation will break down. The 20" casing shoe is here at a depth of level −1250'.

Point E indicates the pressure at the 20" casing shoe, if the BOPs are closed after has having penetrated the well bore.

Point F indicates the pressure at the drill floor 30 with the BOP closed. Point G indicates the maximum permissible back pressure on the divertor when the gas kick is circulated out.

The point H indicates the estimated maximum permissible pressure in the throttle valve when the gas flows out of a well bore.

The curve I indicates the pressure of a kill sludge having a volume weight of 10.2 ppg.

The pressure in the hatched field exceeds the strength of the formation and will make it break down with the risk of losing the drilling platform and the well bore, as described previously.

In the FIG. 10 of the drawing the choke valve 17 is shown being used in connection with a ordinary divertor 32. The reference designation 30 indicates the drill floor, and 33 indicates the rotary table. Otherwise the drilling platform is of the jack-up type. Immediately under the rotary table 33 there is placed a divertor 32 of the conventional design, and between the divertor 32 and the casing pipe 28 there is a spacer spool 34 with a Braden head 35 for coupling-up the casing pipe 28. The one outlet pipe of the divertor is used for the return drilling sludge and is connected to a usual stop valve. The other outlet 36 of the divertor is conducted overboard from the platform by a divertor pipe 37 and the choke valve 17 is positioned in the immediate vicinity of the divertor 32. In case of a kick the divertor 32 is closed and the choke valve 17 is adjusted to the maximum permissible back pressure and till the hydrostatic head is reestablished.

FIG. 11 of the drawing shows another embodiment. Instead of inserting the choke valve 17 into the divertor pipe 37, a fitting 38 is inserted into the spacer spool 34, said spool having two branches 39 and 40 which are curved softly into the flow direction. By this abrasion will be reduced substantially in proportion to the effect of a sudden change of the flow direction—such as it takes place in an ordinary divertor. In the immediate vicinity of the branchings 39, 40 each of these is equipped with a choke valve 17 according to the invention the outlets of which are conducted overboard from the platform by means of divertor lines 37. Placing them so is very advantageous as regards conducting the pipes of the divertor line 37 as regularly as possible. Because of the entire design of the platform the pipeline from the usual divertor 37 placed immediately under the rotary table 33 has essentially more changes of direction compared to the lower placing shown in FIG. 11.

Figure 11A:
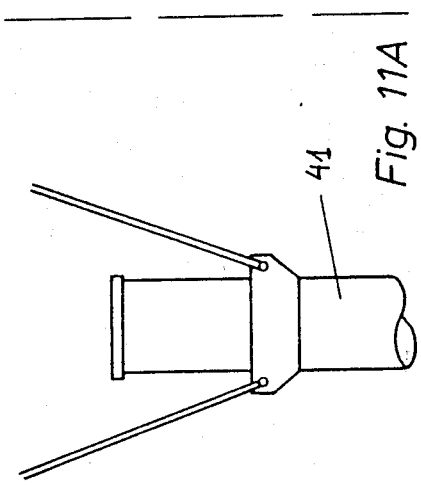

It is obvious that the design described above just as well can be used in connection with a semi-submersible platform or with a drilling ship, in which case the construction will be mounted on top of a telescopic junction 41 (FIG. 11A) between the divertor 32 and the casing pipe 28. The telescopic junction is shown quite schematically to the left in FIG. 11.

FIG. 12 of the drawing illustrates a design quite different from the previous ones, as here the gas from the shallow gas zone instead of being conducted out at the water surface 31 is conducted out immediately above the sea bed 25.

The choke valves 17 and the branching device 38 are positioned immediately above the sea bed, the latter being connected with the top of the casing by means of a Braden head 42. The reference designation 43 indicates a baseplate for the casing pipes. Above the branching device 38 follow in succession a Braden head 44, a BOP 45 and a flexible junction for the pipe 34 up to the submersible drilling platform or to the drilling ship.

The reference number 47 illustrates controlling devices for the choke valves 17 and the BOP 45. The reference designations 48, 49 indicate connecting lines to said control device, so that it can be operated from the drilling platform.

The outlets from the choke valve 17 can freely be conducted in the direction and distance desired, e.g. in the direction of the prevailing current of the sea, so that the escape from the drilling is carried away from there thus reducing the risk of aerating the water under the rig or the drilling ship.

In the FIG. 13 of the drawing is illustrated a hydraulic steering system for steering the movement of the valve seat 10 within the choke valve 17. The valve seat 10 is the component which bends the end of the valve element 8 and presses the latter into the passage of the valve, thus choking the flow of gas and liquid.

The hydraulic operating cylinder 14 can be activated by two separate hydraulic systems. The first hydraulic system 50 can move the valve seat 10 over its total stroke. The other hydraulic system 51 can move the valve seat 10 over its total length of operation.

A control system selects between the two hydraulic systems 50, 51 going out from a pre-determined maximum pressure in a driving system 52 which corresponds to the rise of pressure taking place in the first hydraulic system 50, when the valve seat 10 hits the valve element 8. When said pressure is reached, the control valves automatically shift to the other hydraulic system 51.

In addition, a manual system enables the operator to shift between said two systems.

When the operating cylinder 14 reaches its bottom position, which is the position where the piston rod 16 is totally out of the cylinder 14, the hydraulic flow direction will automatically be reversed.

The other hydraulic system 51 comprises a spring-operated cylinder 53 and with oil on on the spring-loaded side of the piston, said piston being operated by another hydraulic cylinder 54.

The spring-actuated cylinder 53 has a volume which corresponds to the quantity of oil needed to move the operating cylinder 10 the length of one working stroke.

A spring-actuated hydraulic cylinder 55 in the first hydraulic system 50 has a volume which is needed to move the operating cylinder 10 one full length of stroke.

By the other hydraulic system 51 the operating cylinder 10 forces oil to a tank 56. At the return stroke of the cylinder 53 caused by the spring actuating, oil is sucked from the tank 56 to the cylinder 53 through a one-way valve 57.

It should be noticed that all the valves are shown in a position corresponding to the first hydraulic system 50.

When the valve seat 10 hits the valve element 8 the pressure of the driving system 52 rises, by which all the valves shift to a position for the other hydraulic system 51.

The length of stroke of the operating cylinder 14 is controlled by the valve 58. By opening said valve 58 the length of stroke is increased and by throttling the valve 58 the stroke is decreased. When the valve is closed the length of stroke remains unchanged.

The two cylinders 59 and 60 are slave cylinders showing the respective positions of the cylinders 54 and 55. These signals are transmitted to a readiing scale on a control panel.

Hydraulic pressure is produced by a hydraulic pump 61.

The steering system shown has the advantage, that you can control the choke valve completely with one single hand lever. At the same time you may be informed as to the wear on the valve element and thus estimate how much longer the choke valve will be reliable in function.

A control and scale unit is shown in FIG. 14 of the drawing.

FIG. 15 of the drawing quite schematically illustrates a hydraulic system for the valve shown in FIG. 7. The single chambers pressing the valve element into the flow passage of the valve can be set under pressure by a series of valves.

Even though the valve here is described especially in connection with shallow gas blow-outs from oil or gas wells, it is obvious that the employment of the valve is not limited to this special field. For instance it is very suitable for all arrangements where heavily abrasive liquids or gas flow through the choke valve.

It has to be taken into consideration that the well control plan for shallow gas blow-outs are not the exact science which can be used for deeper blow-outs where the casing show allows for much higher pressure readings. There are no exact equations or computer programes which can be used to calculate the weight of kill-mud, pump strokes or choke pressure required to circulate out the incoming gas.

The margin between control and catastrophe is small and good timing and training of the personel is critical.

Shallow gas moves to the surface so fast that it often has surprised the drilling crew by sending the kelly bushing flying in the air. At this critical moment it is important to know that the back-up tool is available.

By using this choke valve in connection with the well trained crew the platform will have a second chance which is otherwise not available on today's drilling rigs.

I claim:

1. A choke valve comprising:
   an inlet at an upstream end thereof;
   an outlet at a downstream end thereof;
   a flexible tubular element between said inlet and said outlet;
   a central passage in said flexible tubular element for permitting a flow of a fluid from said inlet to said outlet;
   means for deforming a downstream end of said flexible tubular element into a controllable position selectively constricting said central passage; and
   said means for deforming further including means for successively deforming additional portions of said flexible tubular element into said controllable position as deformed portions at said downstream end of said flexible tubular member are abraded away by said flow of a fluid, whereby an operating lifetime of said choke valve can be made as long as desired by increasing a length of said flexible tubular element and an operational range of said means for deforming.

2. A choke valve according to claim 1 wherein said central passage includes a diameter substantially equal to a diameter of said inlet and said outlet, when said flexible tubular member is in an undeformed condition.

3. A choke valve according to claim 1 wherein said means for deforming includes:
   an annular support adjacent said inlet;
   an upstream end of said flexible tubular member abutting and being supported by said annular support;
   an annular valve seat at a downstream end of said flexible tubular member;
   said valve seat including in conical surface contacting said downstream end of said flexible tubular member; and
   and means for forcibly urging said conical surface in an axial direction against said downstream end of said flexible tubular member, whereby said downstream end of said flexible tubular member is deformed into its constricting position in said central passage.

4. A choke valve according to claim 3, wherein said means for forcibly urging includes at least one cylinder having a driving rod movable in response to admission of a pressurized fluid into said cylinder, and means for connecting motion produced by said at least one cylinder and driving rod to said valve seat.

5. A choke valve according to claim 4 wherein:
   said at least one cylinder includes at least four cylinders angularly spaced about an axis of said choke valve; and
   said valve seat includes radially extending members aligned for urging by said at least four cylinders.

6. A choke valve according to claim 1 wherein:
   said means for deforming includes a plurality of annular passages surrounding said flexible tubular element;
   each of said annular passages being independently capable of receiving a pressurized fluid, whereby an adjacent portion of said central passage is deformed into said controllable position; and
   said means for successively deforming includes means for successively pressurizing said annular passages, beginning with downstream ones thereof and progressively pressurizing ones upstream, whereby abrasion of said flexible tubular element at deformed portions thereof is accommodated.

7. A choke valve according to claim 6 wherein said means for successively deforming includes progressively depressurizing ones of said annular passages downstream of a furthest-upstream pressurized annular passage, whereby further wear on portions of said flexible tubular element which have previously been abraded is reduced.

8. A choke valve according to claim 1 wherein said flexible tubular element includes a plurality of annular grooves about on inner surface thereof, said plurality of annular grooves providing weak points permitting abraded portions of said flexible tubular element to break off and be carried away with said flow.

9. A choke valve according to claim 8 wherein said flexible tubular element includes a plurality of annular grooves about on outer surface thereof, said plurality of annular grooves providing weak points permitting abraded portions of said flexible tubular element to break off and be carried away with said flow.

10. A choke valve according to claim 1 wherein said flexible tubular element includes a plurality of annular grooves about on outer surface thereof, said plurality of annular grooves providing weak points permitting abraded portions of said flexible tubular element to break off and be carried away with said flow.

* * * * *